US 6,565,414 B2

(12) United States Patent
Abe et al.

(10) Patent No.: US 6,565,414 B2
(45) Date of Patent: May 20, 2003

(54) POLISHING APPARATUS FOR MAGNETIC HEAD AND METHOD THEREFOR

(75) Inventors: Tetsuo Abe, Tokyo (JP); Akio Ogawa, Tokyo (JP); Tsugihiro Hasebe, Tokyo (JP); Hiroshi Shindou, Tokyo (JP); Osamu Fukuroi, Tokyo (JP)

(73) Assignee: TDK Corporation, Tokyo (JP)

( * ) Notice: Subject to any disclaimer, the term of this patent is extended or adjusted under 35 U.S.C. 154(b) by 213 days.

(21) Appl. No.: 09/732,722

(22) Filed: Dec. 11, 2000

(65) Prior Publication Data

US 2002/0072298 A1 Jun. 13, 2002

(51) Int. Cl.⁷ .................................................. B24B 11/00
(52) U.S. Cl. ............................ 451/5; 451/55; 451/276
(58) Field of Search .............................. 451/5, 11, 12, 451/41, 10, 55, 276, 285; 29/603.16

(56) References Cited

U.S. PATENT DOCUMENTS

| 4,010,574 A | * | 3/1977 | Feierabend et al. | ......... 451/272 |
| 4,279,623 A | * | 7/1981 | Bealle | .......................... 451/41 |
| 4,689,877 A |  | 9/1987 | Church |  |
| 5,065,483 A |  | 11/1991 | Zammit |  |
| 5,210,667 A |  | 5/1993 | Zammit |  |
| 5,620,356 A |  | 4/1997 | Lackey et al. |  |
| 5,993,290 A | * | 11/1999 | Yoshihara et al. | ............ 451/28 |
| 6,045,431 A | * | 4/2000 | Chesparov et al. | ............. 451/5 |
| 6,123,608 A | * | 9/2000 | Nakagawa et al. | ......... 451/259 |

FOREIGN PATENT DOCUMENTS

| JP | 55-150120 |   | 11/1980 |   |
| JP | 58-115618 |   | 7/1983 |   |
| JP | 60-076011 |   | 4/1985 |   |
| JP | 02-95572 |   | 4/1990 |   |
| JP | 2-100843 | * | 4/1990 | .................... 451/5 |
| JP | 05-044085 |   | 2/1993 |   |

* cited by examiner

Primary Examiner—Robert A. Rose
(74) Attorney, Agent, or Firm—Oblon, Spivak, McClelland, Maier & Neustadt, P.C.

(57) ABSTRACT

In the polishing work for forming a crown shape on a ceramic bar bearing a plurality of conversion units for the magnetic heads, the present invention is to provide a well-controlled satisfactory shape by pressing the ceramic bar, provided with plural grooves perpendicular to the longitudinal direction and on a surface opposed to the polished plane, to a substantially concave polishing plane through an elastic member principally composed of rubber, then measuring the magneto resistivity of an element provided in the conversion unit of the magnetic head, and adjusting the pressure at the crown forming operation by a closed loop control based on the result of such measurement.

19 Claims, 9 Drawing Sheets

POLISHING APPARATUS FOR MAGNETIC HEAD AND METHOD THEREFOR

BACKGROUND OF THE INVENTION

1. Field of the Invention

The present invention relates to a polishing apparatus for a magnetic head and a method therefor, for polishing a polished article composed of an array of plural magnetic heads, and more particularly to an apparatus and a method for finishing a polished surface into a smoothly curved convex shape (hereinafter called crown shape).

2. Related Background Art

In the batch-based manufacturing process for a thin film magnetic head for use in a disk drive device for computers, there is conventionally included a step of polishing a bar-shaped ceramic (ceramic bar), on which plural conversion units including a thin magnetic film are aligned in an array on the surface, together with such conversion units thereby finishing the throat height of the gap (height of the gap portion) of each conversion unit into an appropriate value. The ceramic bar is cut off into individual conversion unit in a subsequent step, and each cut-off portion constitutes a part of the magnetic head for use in the magnetic disk drive device. In the use of such magnetic head in the magnetic disk drive device, the ceramic portion constitutes a slider which floats on the magnetic disk by the air pressure generated by the rotation of the magnetic disk, and the conversion unit including the thin magnetic film constitutes a head core for recording and/or reproducing the magnetic signal of the disk.

In the above-mentioned conversion unit, there are formed an induction magnetic converting element of signal writing and a magneto resistive (MR) element for signal reading. Also the throat height mentioned above means, in such head core, the length (height) of a portion where the end portions of the two magnetic poles for writing or reading the magnetic signal are mutually opposed with a very small gap therebetween. The magnitude of such throat height has to be maintained at a predetermined value in order to enable appropriate recording and reading of the signal, and a high precision is therefore required for the polishing work.

There have already been proposed apparatus for high precision polishing of the magnetic heads in the form of the above-described ceramic bar (for example the U.S. Pat. No. 5,620,356 etc.). Also the present applicant proposed certain apparatus and methods (for example the Japanese Patent Application No. 11-162799 etc.).

As briefly explained in the foregoing, in the operated state of the disk drive device, the chip member (consisting of slider and head core) at the end of the magnetic head supported by a suspension is maintained in a floating state separate by several hundredths of a micron from the disk, by the pressure of an air flow generated by the high speed revolution of the magnetic disk. The chip member in the floating state has to be constantly maintained in a stable position, in order to achieve accurate information recording and reproduction to and from the magnetic disk.

For this purpose, in certain magnetic heads, the surface, opposed to the magnetic disk, of the chip member positioned at the end of the head is given a rounded or curved shape, thereby suppressing the influence on the floating state of the chip member, resulting from the change in the air flow between the internal and external portions of the magnetic disk.

In order to form such curved shape (hereinafter called crown working or crowning) in a batch process, a ceramic bar bearing plural conversion units including a magnetic thin film is at first polished for obtaining a desired throat height as explained in the foregoing, and is then subjected to a crown working on the same surface for obtaining a desired curved surface shape.

The above-mentioned crown working is possible with the apparatus proposed by the present applicant in the above-mentioned Japanese Patent Application No. 11-162799. This apparatus is provided with a horizontally positioned and rotated polishing table, and a polishing head for supporting a work to be polished (namely ceramic bar bearing plural conversion units) and maintaining such work in a desired position in contact with the polishing table thereby executing polishing of the work. The polishing head is mounted on a mounting frame which is movable in the horizontal direction and in the vertical direction. The polishing head is supported, so as to be rotatable in the horizontal plane, by an annular bearing on the mounting frame.

The polishing head of the apparatus proposed in the Japanese Patent Application No. 11-162799 is provided, at the bottom face thereof, with an adjusting ring. During the polishing operation, the adjusting ring is in contact with the polishing plane, which is the upper surface of the polishing table, thereby defining a reference plane for the position of the polishing head. The polishing head is further provided with an inclining unit, capable of inclining a reference system based on the adjusting ring (namely a system consisting of components fixed to the adjusting ring) by a desired angle about a predetermined horizontal axis. Thus the inclining unit can incline the reference system, including the adjusting ring, by a desired angle with respect to the vertical direction. The inclining operation of the inclining unit is achieved by a motor.

The apparatus is further provided with means adapted, in polishing the polished surface of the ceramic bar constituting the work, for adjusting the bending or torsion of the work, thereby adjusting the horizontal balance of the polished amount. More specifically, the pressure of the work to the polishing table is adjusted in arbitrary plural points in the longitudinal direction of the work, thereby correcting the torsion etc. of the work and adjusting the polished amount.

In the above-described apparatus, in the ordinary polishing operation for setting the throat height to the desired value, the inclination angle of the inclining unit is fixed throughout the polishing process of a work. Also in such polishing process, the polishing plane of the polishing table of the apparatus is maintained perpendicular to the work, whereby the polished surface thereof is polished flat.

Also with such apparatus it is theoretically possible to form a crown on the polished surface, utilizing the inclining unit provided in the apparatus. More specifically, the polished surface can be finished into a rounded shape by executing the polishing operation by gradually and continuously changing the inclining angle of the inclining unit. However, the crown working employing such apparatus is difficult to provide a smooth curved surface of a desired curvature, resulting in a significant fluctuation in the obtained curved surface and requiring complex control of the apparatus in such polishing operation.

For this reason, the crown working of the polished surface of the ceramic bar work is also executed an apparatus provided with a polishing table having a spherical-shaped polishing plane. In an example of such apparatus, the ceramic bar work is attached on a rubber sheet adhered to an end face of a rod-shaped jig and is pressed to the polishing table by means of such jig and the polishing operation is executed under the control of the total pressing pressure. In another example, the ceramic bar work is attached to a jig of square rod shape through rubber and the polishing operation is executed by pressing the polishing head, including the jig and the work, by the weight thereof to the polishing plane.

In summary, the above-described conventional apparatus is incapable of crown working of the magnetic head with a high precision. Also the apparatus disclosed in the Japanese Patent Application No. 11-162799 is impractical for such crown working, because the smoothly curved surface is practically difficult to obtain as the inclination of the inclining unit has to be changed gradually under complex control.

Also in the apparatus provided with the polishing table having the spherical polishing plane, the worked shape obtained by polishing is conventionally controlled by the pressing weight of the work to the polishing table and the working time, and the polished amount cannot be controlled precisely for example because of a change in the polishing rate resulting from the fatigue of the polishing slurry.

SUMMARY OF THE INVENTION

In consideration of the foregoing, the object of the present invention is to provide a polishing apparatus and a polishing method, capable of high-precision crown working of the magnetic heads.

The above-mentioned object can be attained, according to the present invention, by a polishing apparatus for polishing a polished work bearing a plurality of magnetic heads, the apparatus comprising a rotated polishing table having a polishing plane constituting a part of a spherical plane of a predetermined radius of curvature, a frame for mounting a polishing head, rendered movable with respect to the polishing plane, and a polishing head supported by the polishing head mounting frame, wherein the polishing head includes a jig for supporting the polished work through the elastic member, a back plate on which the jig is mounted, an elevator unit capable of ascending and descending integrally with the back plate with respect to the polishing plane and supporting the back plate in rotatable manner about the supporting point and in a plane parallel to the direction of ascending and descending, plural correcting actuator means for pressing the back plate to the polishing plane, measuring means for measuring the characteristics of the magnetic head formed on the polished work, and control means for controlling the pressing forces of the plural correcting actuator means according to the measured value.

For attaining the above-mentioned object, there is preferred a configuration in which the elevator unit is supported by an inclining unit and the direction of ascending and descending is inclined by inclining the inclining unit by inclining unit drive means. Also the polishing head is preferably mounted in rotatable manner on the polishing head mounting means. It is further preferred that the apparatus comprises polishing head rocking means and that the polishing head rocking means causes the polishing head to execute a reciprocating rotary motion within a predetermined angular range.

Also the plural correcting actuator means are preferably composed of three low-friction cylinders, and the pressing portions on the back plate by the low-friction cylinders are preferably positioned on the supporting point of the back plate and on both sides of the aforementioned supporting point in the longitudinal direction of the back plate.

Furthermore, the aforementioned predetermined radius of curvature of the polishing plane is preferably within a range from 4 to 6 meters, and the elastic member is preferably composed principally of rubber. Furthermore, the polished work is preferably provided, on a surface opposed to the polishing plane, with plural grooves perpendicular to the longitudinal direction, and the measured characteristics of the magnetic head is preferably magnetic resistivity.

The above-mentioned object can also be attained, according to the present invention, by a polishing method for polishing a polished work bearing a plurality of magnetic heads, the method comprising a step of causing a jig to support the polished work through an elastic member, a step of moving the jig to a predetermined position relative to a rotated polishing table having a polishing plane constituting a part of a spherical plane of a predetermined radius of curvature, a step of rotatably supporting the jig in a plane substantially perpendicular to the polishing plane and descending the jig onto the polishing plane, and a step of pressing the polished work to the polishing plane through the jig thereby polishing the polished work, wherein the jig can be pressed toward the polishing plane in plural points other than the rotatably supporting point, and the measurement of the polished amount based on the measurement of characteristics of the magnetic head and the adjustment of the pressing forces at the supporting points and the plural points based on the results of measurement are repeated plural times in the polishing step.

Also for attaining the aforementioned object, it is preferred, in the step of causing the jig to support the polished work, to adjust the direction of descent of the jig toward the polishing plane. Also in the polishing step, the jig preferably executes a reciprocating rotary motion within a predetermined angular range about the supporting point where the jig is rotatably supported and substantially parallel to the polishing plane. Also the pressing at the supporting point and the plural points is preferably executed by low-friction cylinders, and the plural pressing points are preferably positioned on both sides of the supporting points in the longitudinal direction of the jig.

Furthermore, the aforementioned predetermined radius of curvature of the polishing plane is preferably within a range from 4 to 6 meters, and the elastic member is preferably composed principally of rubber. Furthermore, the polished work, being supported by the jig through the elastic member, is preferably provided, on a surface opposed to the polishing plane, with plural grooves perpendicular to the longitudinal direction, and the measured characteristics of the magnetic head is preferably magnetic resistivity.

DETAILED DESCRIPTION OF THE PREFERRED EMBODIMENTS

Figure 1:
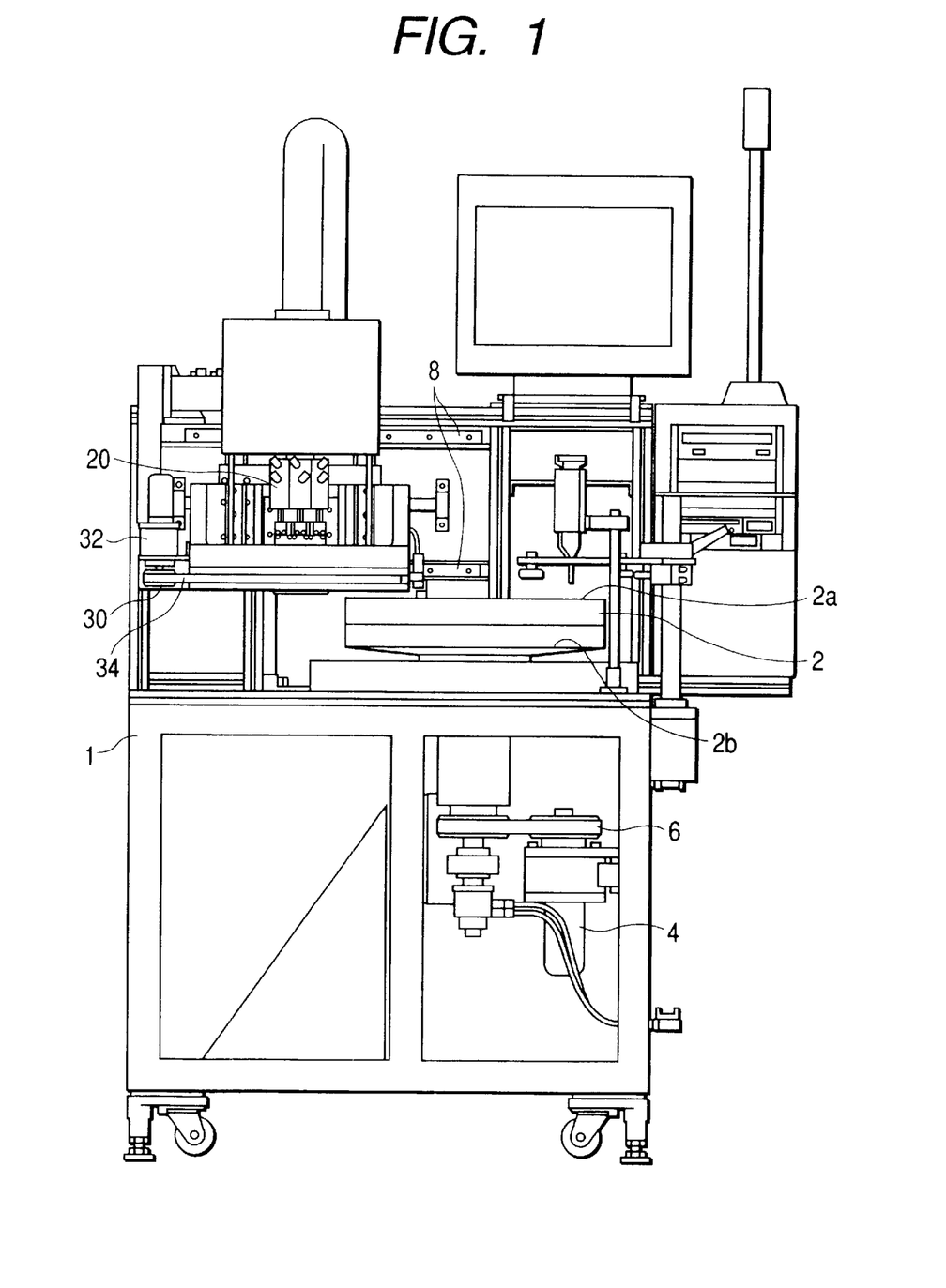
FIG. 1 is an entire elevation view of a polishing apparatus for a magnetic head, according to an embodiment of the present invention.

In the following, the polishing apparatus and method for the magnetic head of the present invention will be clarified, with reference to FIGS. 1 to 11, as an example of an embodiment thereof. FIG. 1 is an entire elevation view showing the magnetic head polishing apparatus embodying the present invention, while FIG. 2 is a plan view thereof, and FIGS. 3 to 6 are respectively an elevation view, a plan view, a lateral view and a lateral cross-sectional view of a polishing head in an embodiment of the present invention.

Figure 2:
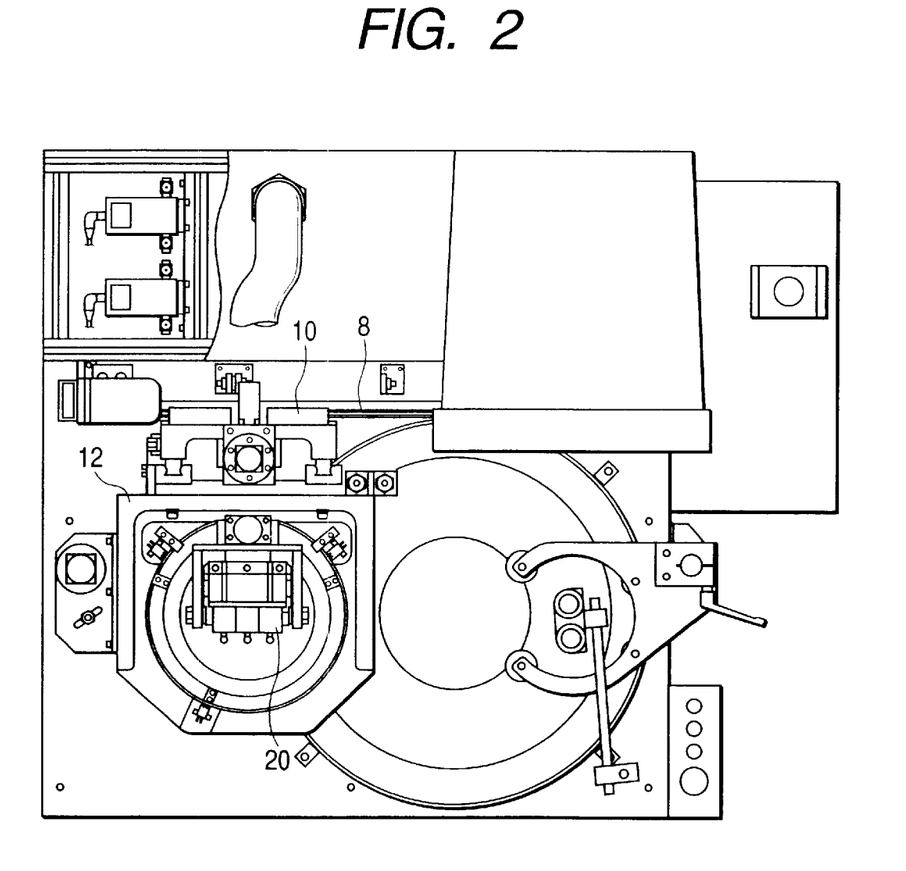
FIG. 2 is an entire plan view of a polishing apparatus for a magnetic head, according to an embodiment of the present invention.

At first, reference is made to FIGS. 1 and 2 for explaining the entire configuration of the polishing apparatus for the magnetic head, embodying the present invention. The magnetic head polishing apparatus is provided with a base 1, which supports a polishing table 2 in rotatable manner in the horizontal plane, and the polishing table 2 is rotated, through a belt 6, by a table driving motor 4 which constitutes a rotary drive source and provided in the base 1.

A pair of guide rails 8 separated vertically are horizontally supported above the base 1, and a laterally movable slider 10 is guided, horizontally movably, by the paired guide rails 8. On the laterally movable slider 10, there is mounted a polishing head mounting frame 12 in vertically movable manner (vertically driven with arbitrarily adjustable height). The laterally movable slider 10 can be driven, for example, by engaging a ball screw nut provided on the slider 10 with a ball screw shaft parallel to the guide rails 8 and rotating the ball screw shaft by a motor, whereby the slider 10 and the polishing head mounting frame 12 can execute a reciprocating linear motion.

Figure 3:
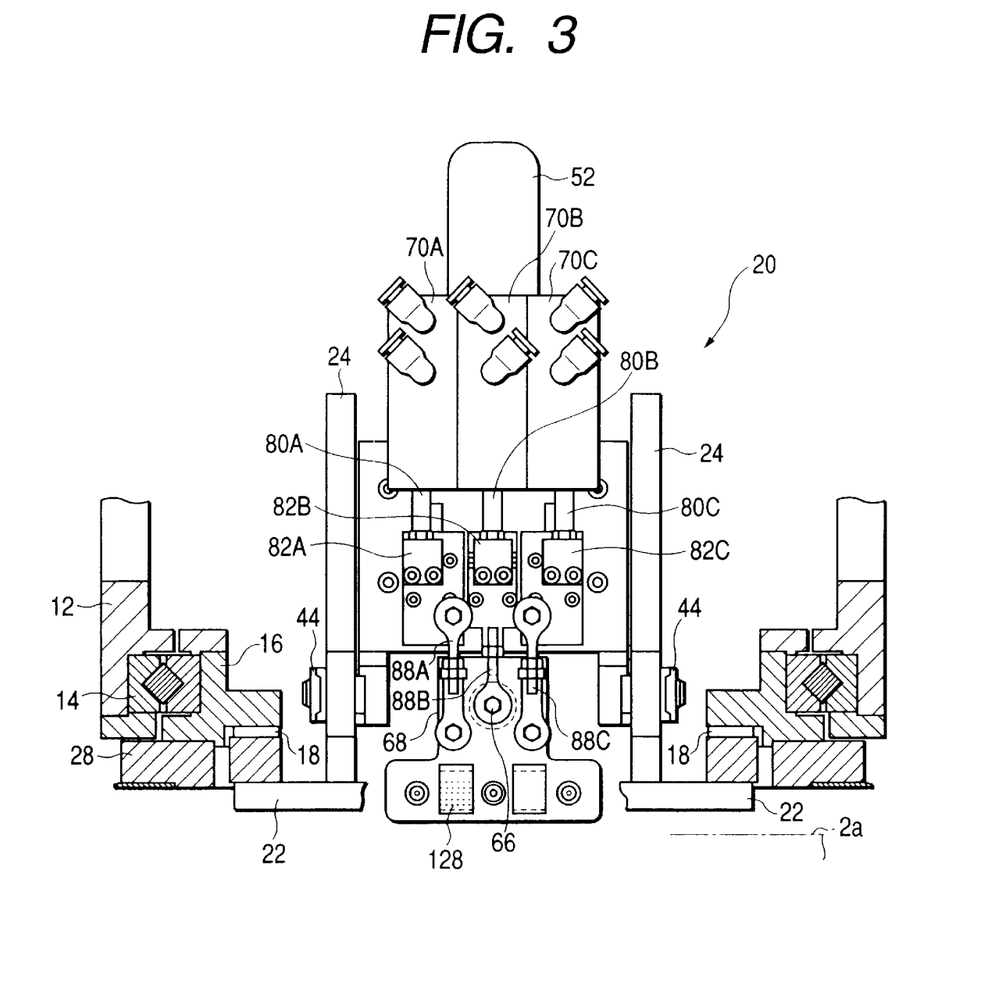
FIG. 3 is an elevation view showing a magnetic head etc. in the polishing apparatus for the magnetic head, constituting an embodiment of the present invention.
Figure 4:
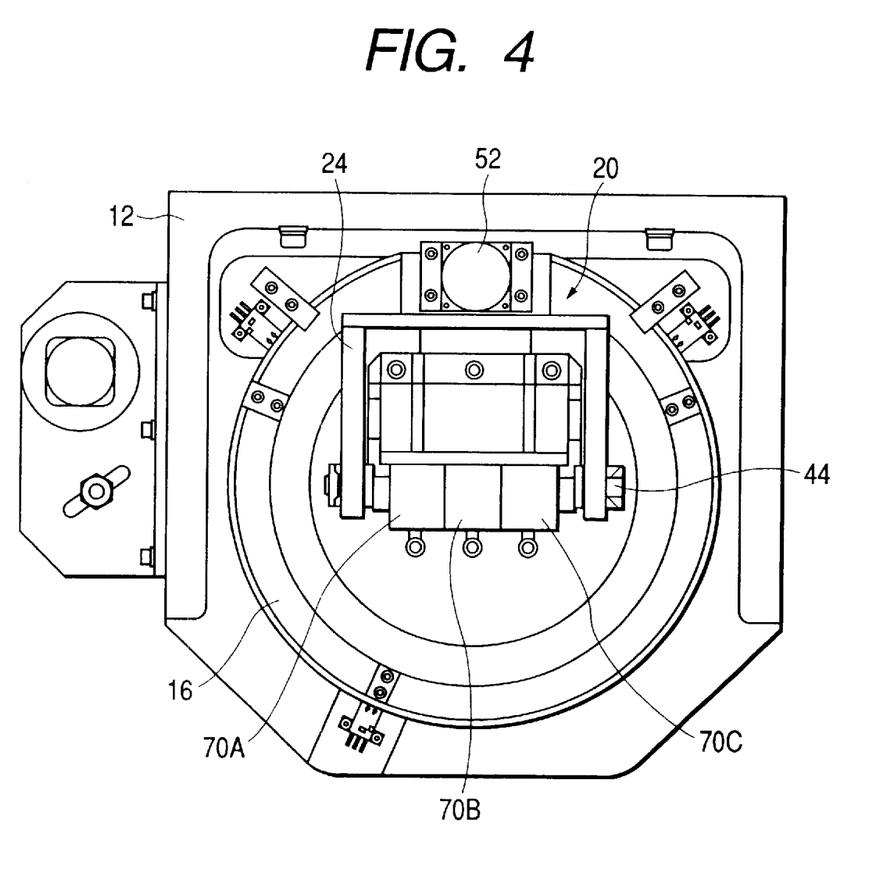
FIG. 4 is a plan view of the polishing head shown in FIG. 3.

Inside the polishing head mounting frame 12, as shown in FIG. 3, a rotary supporting portion 16 is rotatably supported by an annular bearing 14, and a polishing head 20 is mounted on the rotary supporting portion 16 through an elastic member 18 such as a plate spring or rubber. The polishing head 20 is provided with a bottom plate 22 and vertical supporting plates 24 standing thereon in parallel manner.

As shown in FIGS. 2 and 3, a pulley 28 is fixed to the rotary supporting portion 16, and a polishing head rotating motor 32 for rotating a pulley 30 is mounted outside the polishing head mounting frame 12. A belt 34 links the pulleys 28, 30. The motor 32, pulley 28, 30 and belt 34 function as rocking means for causing the polishing head 20 to execute a reciprocating rotating motion (rocking motion) of a predetermined angular range.

As shown in FIGS. 3 to 6, between the vertical supporting plates of the polishing head 20, there is provided an inclining shaft 44 parallel to the vertical supporting plates 24, and an inclining unit 46 is articulated about the inclining shaft 44 in inclinable manner with respect to the polishing head 20.

Figure 5:
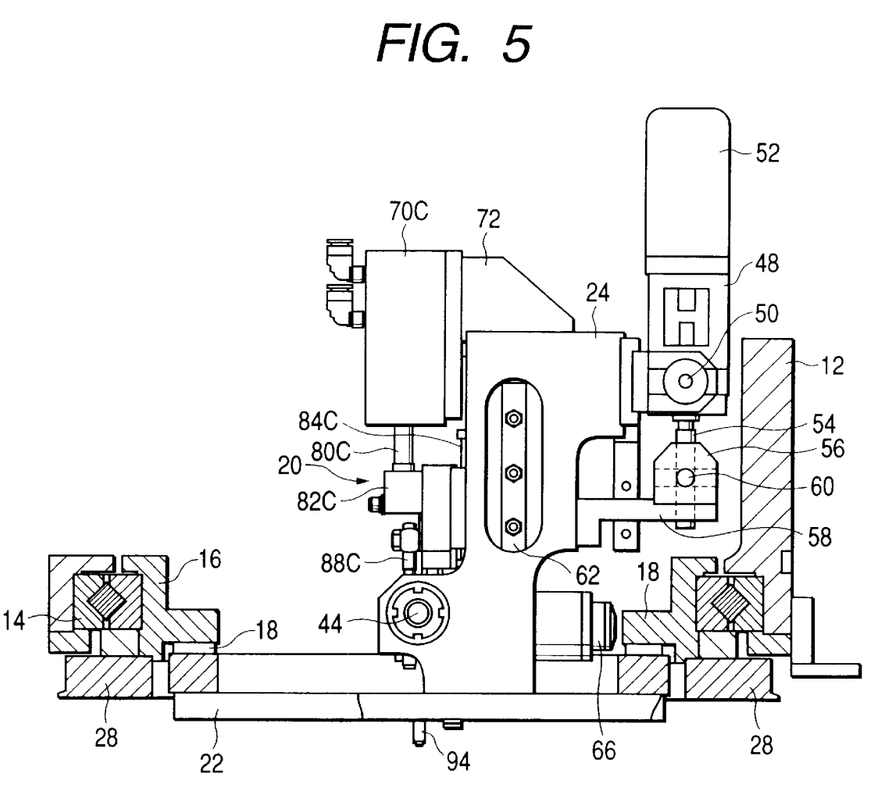
FIG. 5 is a lateral view of the polishing head shown in FIG. 3.
Figure 6:
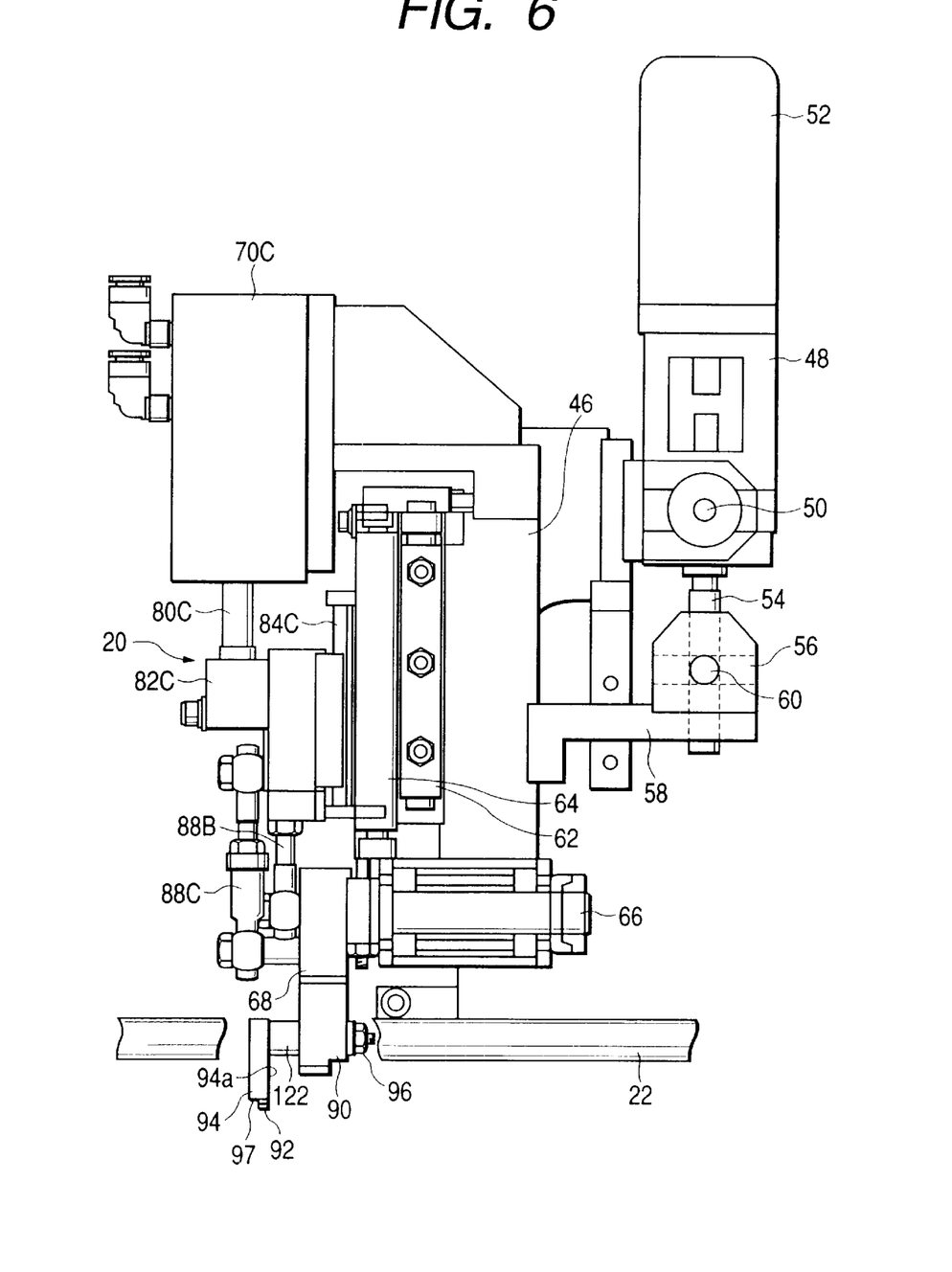
FIG. 6 is a lateral cross-sectional view of the polishing head shown in FIG. 3.

As shown in FIGS. 5 and 6, on the vertical supporting plates 24 of the polishing head 20, the lower part of a motor mounting base portion 48 is mounted in rotatable manner with respect to a shaft 50, and an inclining motor 52 is fixed on the upper part of the motor mounting base portion 48. The driving shaft of the motor 52 is connected to a ball screw shaft 54 which engages with a ball screw nut 56. The ball screw nut 56 is connected, by a shaft 60, to an end of an arm 58 of which the other end is fixed on the inclining unit 46. The mechanism from the shaft 50 to the shaft 60 constitutes inclining drive means for inclining the inclining unit 46, by a predetermined angle from a state parallel to the vertical supporting plates 24.

An elevator unit 64 is vertically movably mounted on the inclining unit 46 through a slide bearing (cross roller guide) 62. As the motion of the elevator unit 64 in the inclined direction is executed integrally with the inclining unit 46, the elevator unit 64 and the inclining unit 46 are always maintained mutually parallel. At the lower end of the elevator unit 64, there is articulated a back plate 68 by a shaft 66 which is parallel to the vertical supporting plates 24 and perpendicular to the inclining shaft 44.

As shown in FIGS. 3 and 5, on the upper part of the inclining unit 46, there are mounted correcting actuator means 70A, 70B, 70C through a bracket 70. The correcting actuator means 70A, 70B, 70C serve to press the shaft 66 of the back plate 68, the left and right sides thereof respectively downwards and to control the load acting on the back plate 68. In the present embodiment, the correcting actuator means are composed of low-friction air cylinders, but there may also be employed other low-friction cylinders of other types such as electromagnetically driven ones.

Rods, 80A, 80B, 80C of the correcting actuator means 70A, 70B, 70C are connected, at the lower ends thereof, to cylinder joints 82A, 82B, 82C each consisting of a screw, a nut, a spherical member etc., so as to be capable of ascent and descent along slide bearings 84A, 84B, 84C mounted on the elevator unit 64. Each of the cylinder joints is rendered capable of rotation of about 5° with respect to the ascending and descending direction of the correcting actuator means, thereby compensating the aberration between the axes of the cylinder joint and the correcting actuator means. The lower ends of the cylinder joints 82A, 82B, 82C are respectively connected to the left side, central part and right side of the back plate 68 by means of connecting links 88A, 88B, 88C. Therefore, as shown in these drawings, the pressing forces of the correcting actuator means 70A, 70B, 70C on the back plate 68 become mutually parallel.

As shown in FIG. 6, the back plate 68 is coupled with a laterally oblong jig 94 by a rectangular plate 90, a fixing pin 96 and a connecting member 122. The laterally oblong jig 94 is provided, on a surface opposed to the polishing table 2 (lower end face in the drawing), with an elastic rubber cushion 97, principally composed of rubber and fixed with an adhesive material for example of epoxy type. A polished work (ceramic bar work) 92 is fixed on and supported by a surface of the rubber cushion 97 opposed to the polishing table 2, by the self adhesive function of the rubber surface or the like. The polished work 92 is pressed to the polishing plane 2a of the polishing table 2 by the correcting actuator means through the function of the above-described components, and, in such pressed state, continues to be supported by the rubber cushion 97 by the self adhesive function thereof.

In the actual polishing operation, the pressing load of the polished work onto the polishing plane 2a is adjusted principally by the correcting actuator means 70B, while the balance of the pressing load in the longitudinal direction of the polished work 92 is adjusted by other correcting actuator means 70A, 70C. Therefore, depending on the fluctuation of the polished amount in the longitudinal direction of the polished work 92, the pressing forces of the correcting actuator means 70A, 70B, 70C may be made partially negative (namely force in the lifting direction).

Figure 8:
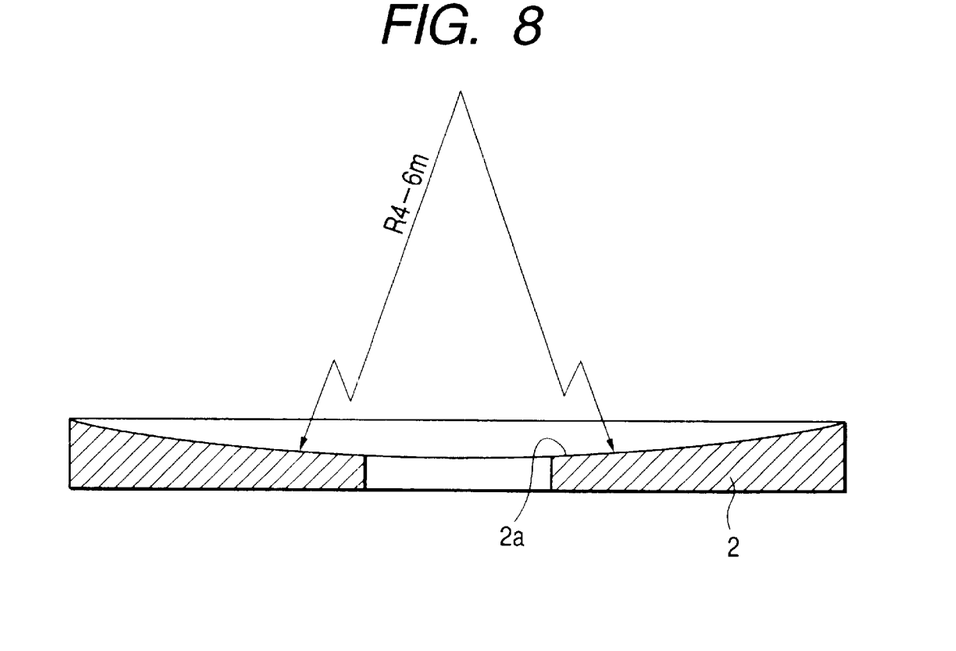
FIG. 8 is a cross-sectional view along the diameter of a polishing table.

The polishing plane 2a of the polishing table 2, consisting for example of tin and employed for polishing the polished work 92, is preferably formed as a concave recessed shape constituting a part of a spherical plane with a predetermined radius, in order to provide the polished plane 92a of the polished work 92 with a predetermined round (convex) shape by the polishing process. FIG. 8 is a cross-sectional view of the polishing table 2 along a diameter thereof. In the present embodiment, the polishing table 2 is formed as a substantially annular shape with a large thickness, wherein the radius of the sphere of which the aforementioned concave polishing plane 2a constitutes a part is selected within a range of 4 to 6 meters.

Also in pressing the polished work 92 to the polishing plane 2a, in order to bring the entire polished plane 92a in contact with the polishing plane 2a by bending the polishing work 92 easily, the polished work 92 is provided, on a surface thereof adhered to the rubber cushion 97, with plural grooves 92b perpendicular to the longitudinal direction of the polished work 92. Owing to the above-described configuration, the polished plane 92a can easily contact the substantially concave polishing plane 2a, whereby a smooth round shape can be obtained on the entire surface along the longitudinal direction of the polished work.

Figure 7:
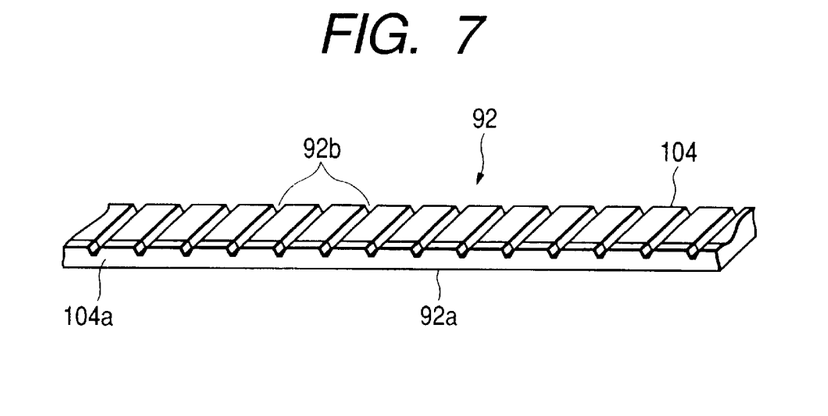
FIG. 7 is a schematic perspective view showing the shape of a polished work.

As shown in FIG. 7, the polished work 92 is composed of an oblong ceramic bar 104 of rectangular rod shape (to be cut off into individual sliders of thin film magnetic heads) on which a plurality of conversion units of the magnetic heads, consisting of magnetic thin film patterns, are arranged in a linear array, and the magnetic thin film patterns of such conversion units are arranged on a longitudinal lateral face 104a of the ceramic bar 104. In the present embodiment, it is assumed that the bottom surface (polished plane) of the ceramic bar 104 is already polished in a preceding step whereby each conversion unit positioned on the longitudinal lateral face 104a is given a predetermined throat height.

Consequently, the polished amount permissible for obtaining the desired round shape has to be so selected as not to significantly change the throat height obtained in the preceding step and to avoid fluctuation of the polished amount of the polished work in the longitudinal direction thereof. The polishing step for obtaining the appropriate throat height and that for obtaining the rounded shape are generally executed in separate polishing apparatus, since the polished amount and the required precision of such polished amount are quite different between these steps.

According to the present invention, the polished amount on the polished work 92 is managed by polishing under so-called closed loop control of measuring the magneto resistivity value (MR value) of the MR elements formed in the plural conversion units in the course of polishing, then determining the required polishing amount based on thus measured value and adjusting the pressing forces on the polished work 92 and the balance thereof according to thus determined polishing amount. In the present embodiment, the polishing operation is executed by measuring, at a predetermined interval, the MR values of the MR elements in a conversion unit formed at the center of the ceramic bar 104 and in conversion units formed in predetermined positions at left and right of the ceramic bar 104. In the present embodiment, the MR value is measured in only three positions, but, in case more accurate control on the polishing amount is required, it is preferable to increase the number of measuring points and that of pressing points on the polished work.

For measuring the MR values of the MR elements formed in the conversion units, a face 94a of the laterally oblong jig 94, opposed to the back plate, is provided in advance with electrodes electrically connected for example by wire bonding to the aforementioned MR elements to be measured. The rectangular plate 90 is provided with measuring pins 128 (cf. FIG. 3) biased for example by springs, so that the aforementioned electrodes and the measuring pins 128 are mutually connected when the laterally oblong jig 94 is fixed to the rectangular plate 90. The measuring pins 128 are connected to unrepresented MR value measuring means, so that the MR values of the predetermined MR elements can be measured by the fixation of the laterally oblong jig 94 to the rectangular plate 90.

Figure 9:
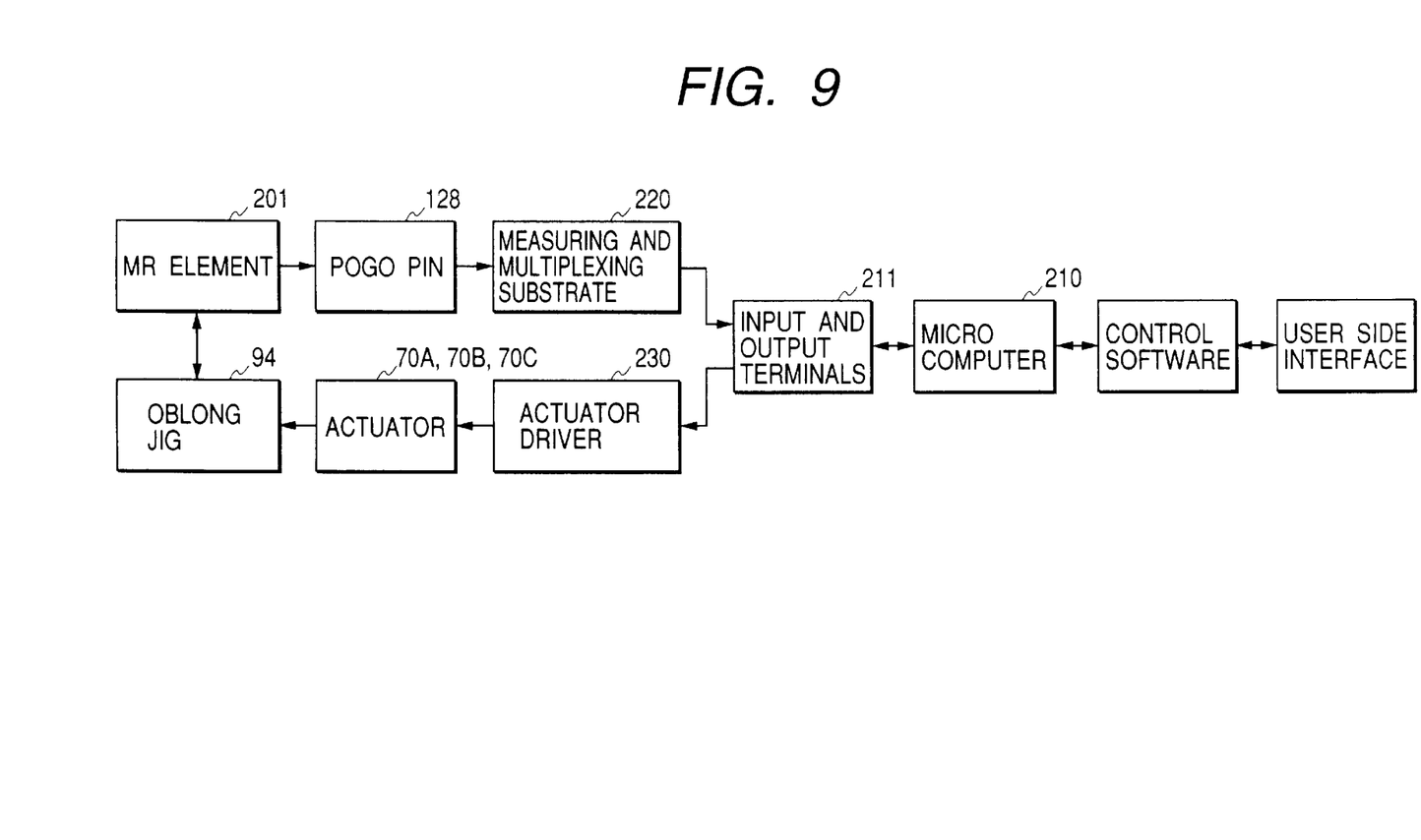
FIG. 9 is a block diagram relating to the control of the polished amount in an embodiment of the present invention.
Figure 10:
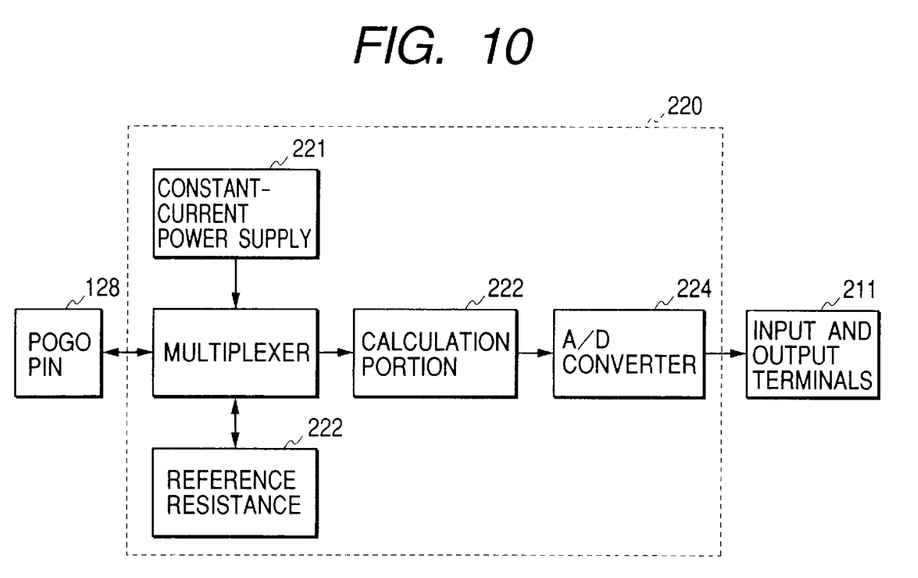
FIG. 10 is a view showing the details of a measuring and multiplexing board in FIG. 9.
Figure 11:
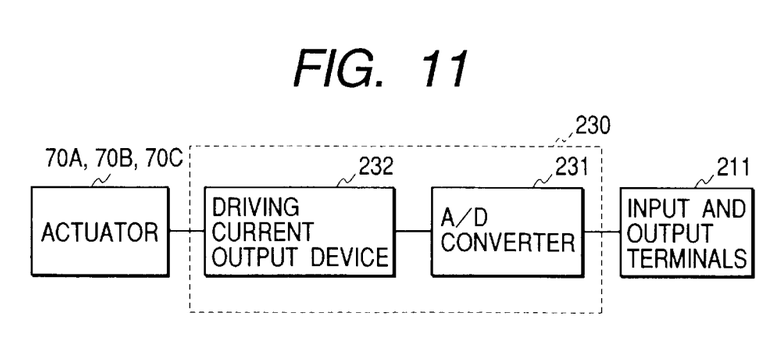
FIG. 11 is a view showing the details of an actuator driving board in FIG. 9.

The actual configuration of the MR value measuring means and control means for the pressing force of the actuator will be explained in the following. FIG. 9 is a block diagram of the control system including the aforementioned measuring means and control means and adapted for driving the correcting actuator means based on the measured MR value, while FIG. 10 is a detailed block diagram of a measuring and multiplexing board 220, and FIG. 11 is a detailed block diagram of an actuator driving board. In the present embodiment, the MR value is obtained by a 4-terminal resistance measurement, and plural measuring pins 128 (POGO pins) are contacted with the MR element 201. The measuring and multiplexing board 220 converts a voltage, obtained from the MR element 201 through the measuring pins 128, into a resistance value using a known a calculation for the 4-terminal resistance measurement. Thus obtained resistance values are converted and multiplexed into digital data and entered into an input/output terminal 211 of a microcomputer 210. The computer 210 calculates the polishing amount of the polished work 92 based on the input data and displays the polishing amount to the operator.

The foregoing process from the MR value measurement to the digital data output will be explained in more detail, with reference to FIG. 10. The measuring and multiplexing board 220 executes the supply of a current from a constant-current source 221 and the voltage measurements between the pins, and executes numerical calculations based on the comparison of the measured value in a calculation unit 223 and a reference resistor 222, thereby obtaining the resistivity of the MR element. The obtained value is further converted into digital data by an A/D converter 224.

Based on the digital data after conversion, there is determined a polishing amount at and in the vicinity of the MR element measured on the polished plane 92a. Then the computer 210 determines, as drive amount data, the drive amounts respectively required in the actuator means 70A, 70B, 70C in order to obtain the necessary polishing amounts. Then the computer 210 provides, through the input/output terminal 211, the actuator driving board 230 with such drive amount data, which are converted into control signals by an A/D converter 231 in the actuator driving board, and a drive current output device 232 receiving such control signals outputs currents for driving the actuator means respectively by the necessary amounts. In response to such outputs, the actuator means execute fine adjustment of the pressing forces on the back plate 68, whereby the balance of the pressures in the longitudinal direction of the polished work 92 on the polishing plane 2a is finely adjusted through the laterally oblong jig 94.

In the present embodiment, the polished amount in the crown working is controlled by the closed loop explained in the foregoing. It is thus rendered possible to achieve fine control of the polished amount, which is difficult to attain in the conventional apparatus, and to eliminate the fluctuation in the polished amount in polished works. Also within a single polished work, it is rendered possible to control the polished amount in the different portions in the longitudinal direction, thereby eliminating the fluctuation in the polished amount within the polished work, difficult to eliminate in the conventional apparatus.

In the following there will be explained the function and the polishing method of the embodiment of the present invention.

At first the polishing head 20 shown in FIGS. 1 and 2 is moved from the position opposed to the polishing table 2, and the laterally oblong jig 94, supporting the polished work 92 on which a plurality of the thin film magnetic heads are arranged, is mounted on the rectangular plate 90 of the back plate 68 by the coupling member 122 and the fixing pin 96. In this operation, the inclination angle of the back plate 68 with respect to the polishing head 20 is initially set at zero degree (perpendicular to the reference plane 2b of the polishing table 2).

In this state, the POGO pins are contacted with the conversion unit of the predetermined magnetic heads to be used for MR measurement for detecting the polishing amount or the wirings extracted from such conversion unit. The POGO pins are pressed by unrepresented springs in order to constantly obtain satisfactory electric contact even in the course of the polishing operation.

After the setting of the inclination angle of the back plate 68 by the inclination drive means and the mounting of the laterally oblong jig 94, the polishing head mounting frame 12 bearing the polishing head 20 is linearly moved along the guide rails 8 and is stopped at a predetermined position above the rotating polishing table 2. Then the polishing head 20 is lowered to the polishing plane 2a constituting the upper surface of the polishing table 2. In this operation, the pressure by the correcting actuator means 70A, 70C is set at zero for both sides (left and right sides in FIG. 3) of the shaft 66 of the back plate 68, thereby enabling rotation of the back plate 68 and the laterally oblong jig 94 about the shaft 66.

The descent of the polishing head 20 is terminated in a state in which the polished work 92 comes into contact, over the entire surface thereof, with the polishing plane 2a. As the polishing plane 2a comes into contact, in an inclined part of the concave recess, with the polished work 92, it is necessary to incline the polished work 92 with respect to the direction of descent, in order to bring the entire surface thereof with the polishing plane 2a. In the present embodiment, as explained in the foregoing, the back plate 68, the laterally oblong jig 94 and the polished work 92 are brought, in a freely rotatable state, into contact with polishing plane 2a, so that the entire polished plane 92a and the polishing plane 2a can be mutually contacted by such rotation, without employing a control mechanism for inclining the polished work 92. Also after the descending operation, the laterally oblong jig 94 is subjected to a small up-and-down movement several times in order to achieve secure contact between the entire polished plane 92a and the polishing plane 2a.

As the polishing plane 2a in the present embodiment is formed as a concave recess, the pressures of the different portions of the polished plane 92a on the polishing plane 2a may vary as a result of rotation of the polished work in the course of the polishing operation, even in case the pressing of the polished work 92 is achieved only by the shaft 66. For this reason, there is adopted a configuration in which the rotary center of the polishing head 20 coincides with that of the polished work 92 and such rotary centers remain on the diameter of the polishing table 2 or the extension thereof in case the polishing head 20 is linearly reciprocated.

The end of the descent of the polishing head 20 is judged by detecting, by an unrepresented proximity sensor of electrostatic capacitance type, that the distance between the sensor and a predetermined position of the polishing plane 2a reaches a predetermined value. There may also be employed a proximity sensor of magnetic detection type or distance detection type utilizing a high frequency wave.

The polishing of the polished plane 92a is achieved by the contact of the entire polished plane 92a and the polishing plane 2a. During the polishing operation, the polished work 92 is pressed to the polishing plane 2a through the elastic rubber cushion 97, and the polished work 92 is provided with the plural grooves 92b perpendicular to the longitudinal direction thereof in order to facilitate contact with the polishing plane 2a. For this reason, the polished work 92 is easily bent even when the shaft 66 is pressed solely by the correcting actuator means 70B, whereby the pressing force is efficiently dispersed over the entire polished plane 92a and there can be reduced the fluctuation in the polished amount in the polished work to the polishing plane simply with the elastic member.

However, the polishing rate and the polished amount may fluctuate on each polished work, depending on the consumption of the polishing diamond slurry inlaid on the polishing plane 2a and the contact state between the polished plane 92a and the polishing plane 2a at the start of the polishing operation. In the present invention, there is adopted a closed loop control of measuring the polished amount and adjusting the pressing force of the correcting actuator means 70B based on thus measured value, thereby enabling fine control of the polished amount and equalizing the polished amount between the different polished works. Also in the course of the polishing step, the pressing forces in the vicinity of both ends of the polished work 92 are adjusted by the correcting actuator means 70A, 70C thereby controlling the polished amount at the same time and reducing the fluctuation of the polished amount in the longitudinal direction of the polished work.

During the above-described polishing operation, there may result an unbalanced abrasion if a same position of the polished work 92 is maintained in contact with the polishing plane 2a. For this reason, the rotary supporting unit 16 bearing the polishing head 20 is reciprocated within a predetermined angular range by the polishing head rocking motor 32, and the polishing head mounting frame 12 is reciprocated linearly within a predetermined range. Therefore, during the polishing operation, the polishing head 20 executes a motion composed of the rotary reciprocating motion and the linear reciprocating motion, thereby preventing the unbalanced abrasion of the polishing plane.

In the foregoing embodiment, the MR value is measured in three points on the polished work and the loads on these points are adjusted by the three correcting actuator means, but the number of the measuring points and that of the loading points are not limited to those explained above. Also the object of measurement is not limited to the MR value, and it is also possible to measure for example the change in resistance by providing the polished work with additional electrodes for measuring the polished amount, or to directly measure the shape of polished surface by optical means such as a microscope and to obtain the polished amount by applying image processing to such polished shape. Also the correcting actuator means is not limited to the low-friction air cylinder employed in the foregoing embodiment but can also be composed of various drive means such as of electromagnetic type.

The rubber cushion fixed on the laterally oblong jig and serving to hold the polished work may be composed of any material with elastic property capable of supporting the polished work by a self adhesive property or a vacuum suction property and of deforming along the substantially concave polishing plane by elastic deformation. Also in the foregoing embodiment, the deformation along the polishing plane is facilitated by providing the polished work with plural grooves perpendicular to the longitudinal direction thereof, but such effect may also be achieved by reducing the thickness of the polished work or by employing a more elastic material for the polished work. Furthermore, the measuring and control means are not limited to the configuration disclosed in the foregoing embodiment but can be composed of any means capable of measuring the polished amount of the polished work and adjusting the pressing force on the polished work, based on the measured value.

The present invention enables easy contact of the entire polished plane with the polishing plane by pressing the polished work to the substantially concave polishing plane through the elastic member principally composed of rubber, and by providing the rear surface of the polished work with plural grooves perpendicular to the longitudinal direction thereof, thereby allowing to obtain a satisfactory crown shape.

It is also rendered possible to eliminate the fluctuation in the polished amount among different polished works, encountered in the conventional apparatus, by controlling the polished amount in the crown working through the aforementioned closed loop control. Also within a single polished work, it is rendered possible to control the polished amount in each of the portions along the longitudinal direction of the polished work, thereby eliminating the fluctuation in the polished amount within each polished work, encountered in the conventional apparatus.

What is claimed is:

1. A magnetic head polishing apparatus for polishing a polished work bearing a plurality of magnetic heads, comprising a rotated polishing table having a polishing plane constituting a part of a spherical plane of a predetermined radius of curvature; a polishing head mounting frame provided movably with respect to said polishing plane; and a polishing head supported by said polishing head mounting frame;

wherein said polishing head includes a jig for supporting said polished work through an elastic member; a back plate on which said jig is mounted; an elevator unit capable of ascending and descending integrally with said back plate with respect to said polishing plane and supporting said back plate in rotatable manner about a supporting point and in a plane parallel to the direction of said ascent and descent; plural correcting actuator means for pressing said back plate to said polishing plane; measuring means for measuring a property of the magnetic head formed on said polished work; and control means for controlling the pressing forces of said plural correcting actuator means according to thus measured value.

2. An apparatus according to claim 1, wherein said elevator unit is supported by an inclining unit, and the direction of said ascent and descent is inclined by inclining the inclining unit by inclining unit drive means.

3. An apparatus according to claim 1 or 2, wherein said polishing head is mounted in rotatable manner on said polishing head mounting frame.

4. An apparatus according to claim 3, further comprising polishing head rocking means which causes said polishing head to execute a rotary reciprocating motion within a predetermined angular range.

5. An apparatus according to claim 4, wherein said plural correcting actuator means are three low-friction cylinders.

6. An apparatus according to claim 5, wherein said low-friction cylinders press said back plate at the supporting point of said back plate and at both sides of said supporting point in the longitudinal direction of said back plate.

7. An apparatus according to claim 1 or 2, wherein said predetermined radius of curvature on said polishing plane is within a range from 4 to 6 meters.

8. An apparatus according to claim 1 or 2, wherein said elastic member is principally composed of rubber.

9. An apparatus according to claim 1 or 2, wherein said polished work is provided with plural grooves on a surface opposed to the polishing plane and perpendicularly to the longitudinal direction of said polished work.

10. An apparatus according to claim 1 or 2, wherein said measured property of the magnetic head is magneto resistivity.

11. A magnetic head polishing method for polishing a polished work bearing a plurality of magnetic heads, comprising:

a step of causing a jig to support a polished work through an elastic member;

a step of moving said jig to a predetermined position relative to a rotated polishing table having a polishing plane constituting a part of a spherical plane of a predetermined radius of curvature;

a step of descending said jig onto said polishing plane while supporting said jig at a supporting point in a rotatable manner in a plane substantially perpendicular to said polishing plane; and a step of pressing said polished work to said polishing plane by said jig thereby polishing said polished work, wherein said jig can be pressed toward said polishing plane in plural points other than said supporting point; and, in said polishing step, there are executed the measurement of the polished amount by measuring a property of the magnetic head and the control of the pressing forces on said supporting point and said plural points based on the result of said measurement.

12. A method according to claim 11, wherein the direction of descent of said jig to said polishing plane is adjusted in said step of causing the jig to support said polished work.

13. A method according to claim 11 or 12, wherein, in said polishing step, said jig executes a rotary reciprocating motion within a predetermined angular range, around said supporting point for rotatably supporting said jig and substantially parallel to said polishing plane.

14. A method according to claim 13, wherein the pressing at said supporting point and said plural points are executed by low-friction cylinders.

15. A method according to claim 14, wherein said plural pressing points are positioned on both sides of said supporting points in the longitudinal direction of said jig.

16. A method according to claim 11 or 12, wherein said predetermined radius of curvature of said polishing plane is within a range from 4 to 6 meters.

17. A method according to claim 11 or 12, wherein said elastic member is principally composed of rubber.

18. A method according to claim 11 or 12, wherein said polished work is in advance provided, in being supported by the jig through the elastic member, with plural grooves perpendicular to the longitudinal direction, on a surface opposed to the polishing plane.

19. A method according to claim 11 or 12, wherein said measured property of the magnetic head is magneto resistivity.

* * * * *